US006544709B1

(12) United States Patent
Wang et al.

(10) Patent No.: US 6,544,709 B1
(45) Date of Patent: Apr. 8, 2003

(54) GLOSSY ELECTROPHOTOGRAPHIC MEDIA COMPRISING AN OPAQUE COATED SUBSTRATE

(75) Inventors: John Wang, Lincoln, RI (US); George Wu, W. Warwick, RI (US); Janice Lee Chin, Westborough, MA (US)

(73) Assignee: Arkwright, Inc., Fiskeville, RI (US)

(*) Notice: Subject to any disclaimer, the term of this patent is extended or adjusted under 35 U.S.C. 154(b) by 0 days.

(21) Appl. No.: 10/036,785

(22) Filed: Oct. 19, 2001

(51) Int. Cl.$^{7}$ .......................... G03G 13/20; B32B 9/00

(52) U.S. Cl. ...................... 430/124; 428/195; 428/413; 428/480; 428/484

(58) Field of Search .......................... 430/124; 428/195, 428/413, 480, 484

(56) References Cited

U.S. PATENT DOCUMENTS

| | | | | |
|---|---|---|---|---|
| 5,055,371 | A | 10/1991 | Lee et al. | 430/126 |
| 5,104,721 | A | 4/1992 | Sun | 428/206 |
| 5,145,749 | A | 9/1992 | Matthew | 428/511 |
| 5,208,093 | A | 5/1993 | Carls et al. | 428/195 |
| 5,208,211 | A | 5/1993 | Kurotori et al. | 503/227 |
| 5,837,351 | A | 11/1998 | Chernovitz et al. | 428/195 |
| 5,846,637 | A | 12/1998 | Malhortra et al. | 428/195 |
| 5,989,686 | A | 11/1999 | Song et al. | 428/195 |
| 6,177,222 | B1 | 1/2001 | McAneney et al. | 430/124 |

FOREIGN PATENT DOCUMENTS

EP 0 633 508 B1 9/2001

OTHER PUBLICATIONS

US 5,032,440, 7/1991, Takeuchi et al. (withdrawn)

*Primary Examiner*—Mark A. Chapman
(74) *Attorney, Agent, or Firm*—Barlow, Josephs & Holmes, Ltd.

(57) ABSTRACT

The invention relates to electrophotographic recording media suitable for use with color copiers and laser printers. The media comprise an opaque substrate coated with a toner-receptive layer containing an epoxy or polyester resin having a melting point in the range of about 105° C. to about 200° C., and a wax having a melting point in the range of about 90° C. to about 200° C. The glossy media have good blocking resistance and are capable of producing high quality colored images.

20 Claims, No Drawings

GLOSSY ELECTROPHOTOGRAPHIC MEDIA COMPRISING AN OPAQUE COATED SUBSTRATE

BACKGROUND OF THE INVENTION

1. Field of the Invention

The present invention relates to electrophotographic recording media suitable for use with toner printing systems such as copiers and laser printers. Particularly, the media comprise an opaque substrate material coated with a toner-receptive layer.

2. Brief Description of the Related Art

In recent years, consumers and businesses have turned to electrophotographic printing systems (e.g., color copiers and color laser printers) to produce digital photographic images on a variety of products. Consumers and businesses can now create digital color images on greeting cards, posters, calendars, newsletters, business cards, advertising brochures, and the like. Manufacturers have introduced new digital cameras, computers, software, color copiers, color laser printers, and imaging media to meet growing demand in the home and business markets.

Generally, in an electrophotographic printing process, toner is used to form an image (i.e., photo, illustration, text, and the like) on a recording medium. Typically, the recording medium comprises a specially coated paper or film substrate. The toner comprises a binder resin and colorant particles, and it is magenta, cyan, yellow, or black colored. The process involves electrically charging a photoconductive surface of a drum or belt in the printing device (copier, printer, etc.). Light is directed at the photoconductive surface to form a latent image. The latent image on the photoconductive surface comprises electrostatic charges replicating the image that will be printed onto the medium. Toner particles are brought into contact with the photoconductor, and the particles are attracted to the charged regions on the photoconductive surface. As the recording medium passes over the toner-containing photoconductive surface, the toner particles are transferred to the medium. The toner image then can be fixed by briefly heating the medium. The heat fuses the toner to the medium creating a final imaged product.

Typically, in the fusing step, the medium passes between heated fuser rollers. Many color copiers and color laser printers contain fuser rollers coated with oil (e.g., silicone oil) to prevent smearing of the image and sticking of the imaged medium to the surface of the roller. For example, the Xerox Docucolor 12 color copier contains such oil-coated fuser rollers. However, such oil-based copiers and printers can have high maintenance costs. Recently, copiers and printers that do not use oil in their fusing stations have been introduced. Several popular models of color laser printers, such as Hewlett Packard (HP) 4500 and Xerox Phaser 790, do not contain oil-coated fuser rollers.

The quality of the printed image is dependent on many factors including the composition of the paper or film media. There is a growing demand for media that can produce digital images of similar quality to traditional photographic camera prints. For example, traditional photo developing machines create a glossy finish on the photo print. Many consumers find the glossy finish of conventional photo prints appealing. High gloss digital photo prints would also be desirable.

McAneney et al., U.S. Pat. No. 6,177,222 B1 discloses photographic papers suitable for use in electrophotographic imaging systems. The paper is coated with a polyester coating having a thickness of about 1 to about 15 microns. According to the patent, the polyester coating absorbs the fused toner particles, thereby resulting in a smooth imaged surface. The patent describes the paper as capable of forming a glossy image, wherein the gloss is uniform across the image. Particularly, the images have a gloss value from about 50 GU to about 100 GU and a gloss variation between about 20 GU to about 10 GU.

Cobum et al., U.S. Pat. No. 6,060,203 discloses coated papers for producing photographic-like output having a uniform glossy finish in an electrostatographic printing process. The printing system comprises: a) a toner comprising a polyester resin having a glass transition temperature ($T_{gt}$), and b) a coated substrate comprising a polyurethane, acrylic, or styrene-acrylic copolymer-based coating having a glass transition temperature ($T_{gc}$). The patent discloses that good results are obtained when ($T_{gc}$) is less than or equal to ($T_{gt}$). The patent further discloses that coatings having high gloss values of 60 to 95% after fusing are preferred.

Chernovitz et al., U.S. Pat. No. 5,837,351 discloses a multi-purpose sheet suitable for use in manual drafting, ink-jet and electrophotographic printing and copying applications. The sheet comprises a base support coated with an aqueous dispersion of a cross-linkable polymer, a cross-linking agent, and pigment. The patent describes transparent vellum paper, film, and opaque paper as suitable base supports. The patent describes bisphenol A—based epoxy resins as suitable cross-linkable polymers and silica, silicate, and calcium carbonate as suitable pigments. According to the patent, the cross-linkable binder polymers coalesce and cross-link to produce a hard discrete surface layer that is ink-wettable and has controlled surface resistivity.

Matthew, U.S. Pat. No. 5,145,749 discloses an electrophotographic paper comprising a coating composition adhered to a substrate. The patent discloses that the coating composition is erasable by local breakage of adhesion of the coating to the substrate. The coating comprises an aqueous emulsion of an acrylic polymer and polymethylmethacrylate, and a wax is selected from polyalkane and polyalkene waxes. The patent discloses that there is a direct and proportional increase in erasability as the amount of wax in the coating composition is increased. According to the patent, the erasability of the coating is improved by replacing at least 15 wt. % of the binder with the wax.

Although some of the above-described media may be capable of providing digital images of adequate quality for some applications, there is a need for media capable of recording improved colored images. Particularly, there is a need for media that can produce high quality digital color images using printers and copiers that do not contain oil-coated fuser rolls. The present invention provides such electrophotographic media.

SUMMARY OF THE INVENTION

The present invention relates to an electrophotographic recording medium comprising an opaque substrate. The front surface of the medium is coated with a toner-receptive layer comprising a resin selected from the group consisting of epoxy and polyester resins having a melting point in the range of about 105° C. to about 200° C., and wax having a melting point in the range of about 90° C. to about 200° C. The amount of wax in the layer is no greater than 14% by weight based on total weight of the layer. The recording[]medium has a surface gloss of at least 70 GU.

Cellulosic materials or polymeric films are suitable opaque substrates. The epoxy resin can be derived from bisphenol A and epichlorohydrin, and the wax can be hydrocarbon (e.g., polyethylene or polypropylene), hydrohalocarbon, ester-containing, synthetic, or natural (e.g., carnauba) waxes. Suitable anti-static agents include cationically and anionically conductive polymers. The toner-receptive layer can further comprise pigment particles such as silica, calcium carbonate, kaolin, aluminum hydroxide, starch, polystyrene, and poly(methyl methacrylate) particles. The coat weight of the toner-receptive layer can be in the range of about 1 to about 15 grams per square meter (gsm). The substrate can have a thickness in the range of about 50 microns (2 mils) to about 200 microns (8 mils).

In one embodiment, the back surface of the medium is also coated with the above-described toner-receptive layer so that the medium is capable of being imaged on either of its surfaces.

The present invention also encompasses a process for producing an image on the electrophotographic recording medium. The process comprises the steps of: a) providing an electrophotographic recording medium as described above; b) applying toner to form an image on the surface of the medium; and c) treating the medium with heat to fuse the toner to the medium. The recording medium can be passed between oil-coated or non-oil-coated heated rollers to fuse the toner to the medium.

DETAILED DESCRIPTION OF THE INVENTION

The present invention relates to an electrophotographic recording medium comprising an opaque substrate having a front surface coated with a toner-receptive layer. The layer comprises a resin selected from the group consisting of epoxy and polyester resins having a melting point in the range of about 105° C. to about 200° C., and wax having a melting point in the range of about 90° C. to about 200° C. The amount of wax in the layer is no greater than 14% by weight based on total weight of the layer. The recording medium has a surface gloss of at least 70 GU as measured by a 60 degree glossmeter.

Any suitable substrate material can be used provided that the material is substantially opaque. By the term, "opaque", as used herein, it is meant that the opacity of the material is at least 70%. Opacity can be measured with a BNL Opacimeter (available from Technidyne Corp., New Albany, Ind.) using standard procedures described in the instrument manual provided by the manufacturer.

For example, opaque polymeric films comprising a polymer such as polyester, polymethylmethacrylate, polyethylene, polystyrene, polyvinylidene fluoride, polyvinyl chloride, polyamide, and polyimide can be used. Alternatively, opaque cellulosic substrates are suitable. For example, papers made from blends of hardwood and softwood fibers are suitable. The papers can contain various sizing agents, pigments, and fillers and be latex-impregnated. Suitable paper substrates are commercially available under various tradenames from companies such as Consolidated Papers, Mohawk Paper Mills Inc., P.H. Glatfelter Company and Garda Cartiere. The manufacturer of the opaque cellulosic substrate may coat the surface of the substrate with polymers such as polyethylene or polypropylene to provide a moisture barrier layer on the surface of the substrate. The coating may enhance surface glossiness of the substrate. The coatings can be formed by extruding the coating composition onto both surfaces (front and back) of the cellulosic substrate. Such "poly-coated" papers are commercially available from companies such as Jen-Coat, Inc. and Felix Schoeller Technical Papers, Inc. Other opaque substrate materials, such as TYVEK (spun-bonded polyolefin) which is available from the DuPont Company, may be suitable.

The thickness of the opaque substrate is not particularly restricted but should generally be in the range of about 50 microns (2 mils) to about 200 microns (8 mils). The opaque substrate has two surfaces. The first surface, which is coated with a toner-receptive layer, may be referred to as the "front surface" or "imaging surface", and the opposite surface may be referred to as the "back surface".

The toner-receptive layer comprises an epoxy or polyester resin having a melting point in the range of about 105° C. to about 200° C. and preferably in the range of 110° C. to 170° C. Suitable epoxy resins include EPON 1007F and EPON 1009F available from Shell Chemical Company. These epoxy resins are derived from bisphenol A and epichlorohydrin. Preferably, the toner-receptive layer comprises an epoxy or polyester resin in an amount of at least about 80% by weight based on total dry weight of the toner-receptive layer. The melting point of the resin may be provided in technical data sheets available from the manufacturer. Melting points can be determined by techniques known in the art such as differential scanning calorimetry, a ring and ball softening test, or testing methods such as ASTM D-3461 as noted in the below Examples.

Further, the toner-receptive layer contains a wax having a melting point in the range of about 90° C. to about 200° C. Preferably, the melting point is in the range of about 90° to about 150° C. Waxes can have a partially crystalline structure and melt over a relatively narrow temperature range. But, some waxes have a more amorphous structure and will melt over a relatively broad range. The melting point of the wax may be provided in technical data sheets available from the manufacturer. Melting points can be determined by techniques known in the art such as differential scanning calorimetry, a ring and ball softening test, or testing methods such as ASTM D-127 as noted in the below Examples.

Suitable waxes include, for example hydrocarbon waxes (e.g., polyethylene and polypropylene), hydrohalocarbon waxes, ester-containing waxes, synthetic waxes, and natural waxes (e.g., carnauba wax); provided, however, that the wax has a melting point in the range of about 90° C. to about 200° C. Mixtures of wax particles including mixtures of hydrocarbon wax particles and polytetrafluoroethylene (PTFE) powders can also be used. Suitable wax materials are commercially available from Micro Powders, Inc.

Preferably, the wax particles have a mean diameter in the range of about 1 to about 50 microns and more preferably in the range of about 5 to about 20 microns. The toner-receptive layer should contain no greater than 14% by weight wax based on total dry weight of the layer, since higher loadings can have a detrimental effect on surface gloss and print quality. Preferably, the toner-receptive layer comprises wax in an amount of at least 0.5 wt. % and no greater than 14 wt. % based on total dry weight of the toner-receptive layer. More preferably, the wax is present in an amount of about 1 wt. % to about 5 wt. %.

While not wishing to be bound by any theory, it is believed that the above-described toner-receptive resins and wax particles act in a synergistic manner to produce several desirable effects. Thus, the media of this invention can be used in oil-containing and oil-free electrophotographic machines. When heated, the wax softens and part of the softened wax modifies the physical properties of the toner-receptive layer while another part of the softened wax forms a thin film between the toner-receptive layer and the fuser roll. It is thought that this softened wax compensates, at least in part, for the lack of oil in oil-free electrophotographic machines. Upon cooling, part of the wax returns to its initial role as a constituent of the toner-receptive layer, and part of it contributes to the interface between the toner-receptive layer/toner/wax layer structure and air that can cause an increase in surface glossiness of the medium. The increase in surface gloss could be due in part to a reduction in surface roughness.

The toner-receptive layer can contain anti-static agents to control static electricity build-up that may occur during the feeding, imaging, and handling of the media. The anti-static agent can modify the electrical properties of the recording medium and help provide for transferring and fusing of the toner to the medium's surface. Poorly controlled electrical properties on the imaging surface can lead to imaging defects such as image break-ups, hollow characters and deletions. Preferably, the toner-receptive layer contains anti-static agents in an amount of about 2 to about 8% by weight based on total dry weight of the toner-receptive layer. Suitable anti-static agents include sulfonated polystyrene, copolymers of dimethyl diallyl ammonium chloride, diacetone acrylamide, poly(dimethyl diallyl ammonium chloride), quaternary cellulose acetate, quaternary acrylics, inorganic salts such as ammonium chloride and sodium chloride, and other conductive materials known in the art.

In addition, the toner-receptive layer can comprise organic or inorganic particles to help control surface frictional properties of the recording medium. The particles are also useful for preventing imaging defects and reducing static electricity build-up. Useful particles include silica, calcium carbonate, kaolin, alumina, starch, olystyrene, poly (methyl methacrylate), and the like.

Coating additives, such as wetting agents, de-foaming agents, and dispersing agents, may also be incorporated in the coating formulation to improve application of the coating onto the substrate. Preferred surface wetting agents include BYK 348 and 325 (polyether modified dimethyl polysiloxane copolymers available from BYK-Chemie).

The toner-receptive layer can be prepared from either aqueous or non-aqueous-based coating formulations. The toner-receptive can be coated onto the substrate using any method known in the art including roller, rod, doctor-knife, gravure, slot-die, wire-bar, dip, and air-knife coating methods. Typically, the coat weight of the toner-receptive layer is in the range of about 1 to about 15 grams per square meter (gsm). The media of this invention can comprise single or multiple coating layers on its front surface. For example, the opaque substrate can be coated with an intermediate layer (i.e., inter-coat) and the toner-receptive coating can overlay this layer(s).

The back surface of the substrate can be non-coated, coated with the same compositions used on the front surface, or coated with a different composition than used on the front surface. If the same coating compositions are used on the front and back surfaces of the substrate, the medium may be referred to as having symmetrical coatings. If different coating compositions are used on the front and back surfaces, the medium may be referred to as having asymmetrical coatings. It can be advantageous to coat the back surface of the substrate with the same toner-receptive layer used on the front surface, thereby creating a medium that can be imaged on either of its surfaces. A consumer can insert such products into the feed tray of a printer or copier with confidence that the "correct side is facing-up". Alternatively, other coatings can be used on the back surface of the medium to help reduce static electricity build-up during the feeding, imaging, and handling of the media and/or to improve moisture-resistance of the media.

The electrophotographic media of this invention are characterized as having good surface gloss and blocking resistance i.e. the media do not stick to each other. Particularly, the media have a surface gloss of at least 70 GU. Further, the media of this invention can be fed into color copiers and laser printers to form images having good color quality. The media are particularly suitable for use with printing devices that do not contain oil-coated fuser rolls.

The invention is further illustrated by the following examples using the below Test Methods, but these examples should not be construed as limiting the scope of the invention.

Test Methods

Blocking

Non-imaged (i.e., non-printed) media samples were evaluated for blocking resistance. Each media sample was cut into four (4) pieces, each measuring 2 inches×2 inches, and the pieces were stacked on top of each other so that the coated front surface of one piece contacted the non-coated back surface of another piece. A glass plate was placed on top of the stack, and a ten (10) pound metal weight was placed on the glass plate. The stack (with weight) was placed in an oven at a temperature of about 60° C. for sixteen (16) hours. The stack was then removed from the oven, and the pieces of media were inspected to determine whether or not they stuck to each other. If there were no adhered pieces in the stack, the blocking resistance of the media was rated good. If there were some (2–4) adhered pieces in the stack, the blocking resistance of the media was rated poor.

Surface Gloss

The surface gloss of each media sample was measured using a Micro Tri-Gloss Meter (available from BYK Gardner, Inc.) according to the standard procedures described in the instrument manual provided by the manufacturer. The surface gloss was measured on 8.5"×11" non-imaged (i.e., non-printed) sheets. The Micro-Tri Gloss Meter was calibrated at sixty (60) degrees using the standard supplied by the unit. The sample was placed on a flat surface and the surface gloss was measured at sixty (60) degrees. Measurements were made on three (3) sample sheets, and the average value was reported in terms of gloss units (GU).

As described above, the surface gloss of non-imaged sheets was measured. In addition, the sheets were printed with an image using a Xerox Docucolor 12 color copier (oil-based) or Xerox Phaser 790 laser printer (oil-free), and the surface gloss of the image on the sheet was measured using the foregoing method. The samples were printed with a test pattern image comprising colored squares. The test pattern included squares of solid primary colors (cyan, magenta, yellow, and black), and blends of primary colors (red, green, and violet).

Print Quality

The media samples were fed through a Xerox Docucolor 12 color copier (oil-based) or Xerox Phaser 790 laser printer (oil-free) using the bypass trays and imaged. The Xerox Docucolor 12 color copier was set at extra heavy paper mode, and the Xerox Phaser 790 laser printer was set at glossy paper mode. Printing was conducted under ambient conditions. The samples were printed with a test pattern comprising colored squares. The test pattern included squares of solid primary colors (cyan, magenta, yellow, and black), and blends of primary colors (red, green, and violet).

The printed samples were manually inspected to determine the overall quality of the printed image, and the samples were rated per the following scale:

Good—Minor variation in gloss level between printed squares, and no visible print defects.

Fair—Major variation in gloss level between printed squares and some visible print defects.

Poor—Many visible print defects such as embossing marks.

Jammed—Images could not be printed on the media because of sheet feeding problems—sheets jammed together.

EXAMPLES

In the following Examples 1–10, a toner-receptive coating solution was prepared by mixing the following components.

| | |
|---|---|
| Methylethyl Ketone | 36.87 parts |
| Toluene | 36.87 parts |
| EPON 1007F(1) | 24.58 parts |
| CYASTAT 609(2) | 1.18 parts |
| WAX PARTICLES(3) | 0.50 parts |

(1)EPON 1007F: an epoxy resin derived from bisphenol A and epichlorohydrin, available from Shell Chemicals Inc. EPON 1007 has a Mettler melt point (ASTM D 3461) of 120–130° C. and epoxide equivalent weight of 1700 to 2300.
(2)CYASTAT 609: a quaternary salt type cationic anti-static agent available from Cytec Industries, Inc.
(3)WAX PARTICLES: See the following Examples 1–10 for the various wax particles.

In Examples 1–10, the coating solution was applied to a surface of an 80 lb. Gloss cover paper (GARDA), available from Garda Cartiere, using a Meyer coating rod. The opacity of the paper was 89%. The coating was dried in an oven at a temperature of 250° F. for one (1) minute. The toner-receptive layer contained 96.7% epoxy resin, 1.0% wax particles, and 2.3% anti-static agent based on dry weight of the layer. The finished media samples were imaged using a Xerox Docucolor 12 color copier or Xerox Phaser 790 laser printer and evaluated as described in the above Test Methods. Results are reported below in Tables 1 and 2.

Example 1

In this Example 1, MPP 620XF, a polyethylene wax available from Micro Powders, Inc., was used in the coating formulation. The wax has a melt point (ASTM D-127) of 114° to 116° C. and mean particle size of 5.0 to 6.0 microns.

Example 2

In this Example 2, PROPYLTEX 325S, a polypropylene wax available from Micro Powders, Inc., was used in the coating formulation. The wax has a melt point (ASTM D-127) of 160° to 170° C. and mean particle size of 11.0 to 15.0 microns.

Example 3

In this Example 3, MP-22XF, a straight chain hydrocarbon wax available from Micro Powders, Inc., was used in the coating formulation. The wax has a melt point (ASTM D-127) of 102° to 106° C. and mean particle size of 5.0 to 6.0 microns.

Example 4

In this Example 4, POLYFLUO 523XF, a mixture of polyethylene wax and polytetrafluoroethylene (PTFE) powder available from Micro Powders, Inc., was used in the coating formulation. The wax has an effective melt point (ASTM D-127) of 113° to 117° C. and mean particle size of 3.5 to 5.5 microns.

Example 5

In this Example 5, MICROCLEAR 116, a mixture of polyethylene wax and carnauba wax available from Micro Powders, Inc., was used in the coating formulation. The wax has a melt point (ASTM D-127) of 107° to 113° C. and mean particle size of 4.5 to 5.5 microns.

Example 6

In this Example 6, SYNFLUO 178XF, a mixture of hydrocarbon wax and polytetrafluoroethylene (PTFE) powder available from Micro Powders, Inc., was used in the coating formulation. The wax has an effective melt point (ASTM D-127) of 104° to 110° C. and mean particle size of 3.0 to 5.0 microns.

Example 7

In this Example 7, SYNFLUO 180XF, a mixture of hydrocarbon wax and polytetrafluoroethylene (PTFE) powder available from Micro Powders, Inc., was used in the coating formulation. The wax has an effective melt point (ASTM D-127) of 104° to 110° C. and mean particle size of 3.0 to 5.0 microns.

Example 8

In this Example 8, MPP 620F, a polyethylene wax available from Micro Powders, Inc., was used in the coating formulation. The wax has a melt point (ASTM D-127) of 114° to 116° C. and mean particle size of 9.0 to 11.0 microns.

Example 9

In this Example 9, POLYFLUO 150, a mixture of polyethylene wax and polytetrafluoroethylene (PTFE) powder available from Micro Powders, Inc., was used in the coating formulation. The wax has an effective melt point (ASTM D-127) of 113° to 116° C. and mean particle size of 3.5 to 5.5 microns.

Example 10

In this Example 10, MP-22, a straight chain hydrocarbon wax available from Micro Powders, Inc., was used in the coating formulation. The wax has a melt point (ASTM D-127) of 102° to 106° C. and mean particle size of 9.0 to 11.0 microns.

Example 11

In the following Example 11, an inter-coat solution was prepared by mixing the following components.

| | |
|---|---|
| Methylethylketone | 60.00 parts |
| Methylpropylketone | 15.00 parts |
| EPON 1009F(4) | 24.8 parts |
| BYK 325 | 0.2 parts |

(4)EPON 1009F: an epoxy resin derived from bisphenol A and epichlorohydrin, available from Shell Chemicals Inc. EPON 1009F has a Mettler melt point (ASTM D 3461) of 130–140° C. and epoxide equivalent weight of 2300 to 3800.

In addition, a top-coat solution was prepared by mixing the following components.

| | |
|---|---|
| Methylethylketone | 72.00 parts |
| Methylpropylketone | 18.00 parts |
| EPON 1007F | 9.10 parts |
| CYASTAT 609 | 0.30 parts |
| MP 22 Wax Particles(5) | 0.80 parts |
| BYK 325(6) | 0.5 parts |

(5)MP 22: a straight chain hydrocarbon wax available from Micro Powders, Inc. The wax has a melt point (ASTM D-127) of 102° to 106° C. and mean particle size of 9.0 to 11.0 microns.
(6)BYK 325: a solution of polyether modified methylalkylpolysiloxane copolymer, available from Byk-Chemie USA, Inc.

In Example 11, the coating solutions were applied to a surface of an 80 lb. Gloss cover paper (GARDA), available from Garda Cartiere, using a Meyer coating rod. The opacity of the paper was 89%. First, the inter-coat was applied to form an intermediate layer. The coating was dried in an oven at a temperature of 250° F. for one (1) minute. The intermediate layer contained 99.56% epoxy resin and 0.44% flow agent based on dry weight of the layer. Next, the above-described top-coat solution was applied to form a toner-receptive layer. The coating layer was dried in an oven at a temperature of 250° F. for thirty (30) second. The toner-receptive layer contained 88.18% epoxy resin, 7.75% wax particles, 1.45% anti-static agent, and 2.62% flow agent based on dry weight of the layer. The finished media samples were imaged using a Xerox Docucolor 12 color copier or Xerox Phaser 790 laser printer and evaluated as described in the above Test Methods. Results are reported below in Tables 1 and 2.

Comparative Example A

In the following Comparative Example A, a toner-receptive coating solution was prepared by mixing the following components.

| | |
|---|---|
| Methylethylketone | 72.00 parts |
| Methylpropylketone | 18.00 parts |
| EPON 1007F | 9.10 parts |
| CYASTAT 609 | 0.30 parts |
| MP 22 | 1.60 parts |
| BYK 325 | 0.50 parts |

First, an inter-coat solution was applied to the surface of a paper substrate and dried as described in above Example 11. Next, the above-described top-coat solution was applied to form a toner-receptive layer. The toner-receptive layer was dried in an oven at a temperature of 250° F. for thirty (30) seconds. The toner-receptive layer contained 81.83% epoxy resin, and 14.39% wax particles based on dry weight of the layer. The finished media samples were imaged using a Xerox Docucolor 12 color copier or Xerox Phaser 790 laser printer and evaluated as described in the above Test Methods. Results are reported below in Tables 1 and 2.

Comparative Example B

In the following Comparative Example B, a toner-receptive coating solution was prepared by mixing the following components.

| | |
|---|---|
| Methylethylketone | 70.00 parts |
| Methylpropylketone | 16.10 parts |
| EPON 1007F | 9.10 parts |
| CYASTAT 609 | 0.30 parts |
| MP 22 | 4.00 parts |
| BYK 325 | 0.50 parts |

First, an inter-coat solution was applied to the surface of a paper substrate and dried as described in above Example 11. Next, the above-described top-coat solution was applied to form a toner-receptive layer. The toner-receptive layer was dried in an oven at a temperature of 250° F. for thirty (30) seconds. The toner-receptive layer contained 67.31% epoxy resin, 29.58% wax particles, 1.11% anti-static agent, and 2.00% flow agent based on dry weight of the layer. The finished media samples were imaged using a Xerox Docucolor 12 color copier or Xerox Phaser 790 laser printer and evaluated as described in the above Test Methods. Results are reported below in Tables 1 and 2.

Comparative Example C

In the following Comparative Example C, a toner-receptive coating solution was prepared by mixing the following components.

| | |
|---|---|
| Methylethyl Ketone | 37.5 parts |
| Toluene | 37.5 parts |
| EPON 1007F | 25.0 parts |

The coating solution was applied to a surface of an 80 lb. Gloss cover paper (GARDA), available from Garda Cartiere, using a Meyer coating rod. The opacity of the paper was 89%. The coating was dried in an oven at a temperature of 250° F. for one (1) minute. The toner-receptive layer contained 25% epoxy resin based on dray weight of the layer. The toner-receptive layer did not contain any wax. The finished media samples were imaged using a Xerox Docucolor 12 color copier or Xerox Phaser 790 laser printer and evaluated as described in the above Test Methods. Results are reported below in Tables 1 and 2.

Comparative Example D

In the following Comparative Example D, a toner-receptive coating solution was prepared by mixing the following components.

| | |
|---|---|
| Methylethyl Ketone | 37.5 parts |
| Toluene | 37.5 parts |
| EPON 1004F(7) | 25.0 parts |

(7)EPON 1004F: an epoxy resin derived from bisphenol A and epichlorohydrin, available from Shell Chemicals Inc. EPON 1004F has a Mettler melt point (ASTM D 3461) of 95–105° C. and epoxide equivalent weight of 800 to 950.

The coating solution was applied to a surface of a POLY-JET 112 lb. Text 6 mil clay-filled paper, available from P.H.

Glatfelter Company. The opacity of the paper was 95%. The coating was dried in an oven at a temperature of 250° F. for one (1) minute. The toner-receptive layer contained 25% epoxy resin based on dray weight of the layer. The finished media samples were imaged using a Xerox Docucolor 12 color copier or Xerox Phaser 790 laser printer and evaluated as described in the above Test Methods. Results are reported below in Tables 1 and 2.

Comparative Example E

Commercially available photo paper sheets from Xerox Corp. (Digital Color Photo Glossy Paper—Reorder No. 3R12155), Rochester, N.Y., were imaged using a Xerox Docucolor 12 color copier or Xerox Phaser 790 laser printer and evaluated as described in the above Test Methods. Results are reported below in Tables 1 and 2.

TABLE 1

(Surface Gloss)

| Sample | Surface Gloss of Non-Imaged Media | Surface Gloss of Image on Imaged Media (Xerox DC 12) | Surface Gloss of Image on Imaged Media (Xerox 790) |
|---|---|---|---|
| Example 1 | 85.3 | 81.5 | 53.5 |
| Example 2 | 81.0 | 80.1 | 52.1 |
| Example 3 | 84.4 | 77.5 | 55.4 |
| Example 4 | 77.0 | 91.0 | 49.1 |
| Example 5 | 77.0 | 87.6 | 49.0 |
| Example 6 | 80.0 | 85.8 | 57.9 |
| Example 7 | 79.2 | 85.6 | 52.5 |
| Example 8 | 74.6 | 90.8 | 53.4 |
| Example 9 | 74.8 | 91.3 | 48.4 |
| Example 10 | 73.0 | 90.2 | 53.4 |
| Example 11 | 93.6 | 83.4 | 35.3 |
| Comp. Ex. A | 70.4 | 74.0 | 26.6 |
| Comp. Ex. B | 65.5 | 79.1 | 21.6 |
| Comp. Ex. C | 83.6 | 90.3 | 26.0 |
| Comp. Ex. D | 85.7 | 83.6 | No images-paper jammed |
| Comp. Ex. E | 97.4 | 92.0 | No images-paper jammed |

TABLE 2

(Print Quality and Blocking Resistance)

| Sample | Print Quality of Imaged Media (Xerox DC 12) | Print Quality of Imaged Media (Xerox 790) | Blocking Resistance of Non-Imaged Media |
|---|---|---|---|
| Example 1 | Good | Good | Good |
| Example 2 | Good | Good | Good |
| Example 3 | Good | Good | Good |
| Example 4 | Good | Good | Good |
| Example 5 | Good | Good | Good |
| Example 6 | Good | Good | Good |
| Example 7 | Good | Good | Good |
| Example 8 | Good | Good | Good |
| Example 9 | Good | Good | Good |
| Example 10 | Good | Good | Good |
| Example 11 | Good | Good | Good |
| Comp. Ex. A | Fair | Fair | Good |
| Comp. Ex. B | Fair | Fair | Good |
| Comp. Ex. C | Good | Poor | Good |
| Comp. Ex. D | Fair | No images-paper jammed | Poor |
| Comp. Ex. E | Good | No images-paper jammed | Poor |

As shown in above Table 1, for non-imaged media and media printed with an image using the Xerox DC-12 color copier (oil-based), surface gloss tends to be relatively high (greater than 70 GU). In contrast, when a non-oil based machine such as the Xerox 790 laser printer is used, the surface gloss of the printed image tends to be relatively low (less than 60 GU). However, even when such a non-oil-based machine is used, the media of this invention are capable of providing images having relatively good surface gloss (at least 35 GU) versus other media. In addition, as shown in above Table 2, the non-imaged media of this invention exhibit good blocking resistance in contrast to other media. Further, when the media of this invention are printed with images using the Xerox DC-12 color copier or Xerox 790 laser printer, the print quality of the image is good in contrast to images produced on other media.

What is claimed is:

1. An electrophotographic recording medium comprising an opaque substrate having a surface coated with a toner-receptive layer comprising a resin selected from the group consisting of epoxy and polyester resins having a melting point in the range of about 105° C. to about 200° C., and wax having a melting point in the range of about 90° C. to about 200° C., wherein the amount of said wax in the layer is no greater than 14% by weight based on total weight of the layer, said recording medium having a surface gloss of at least 70 GU.

2. The recording medium of claim 1, wherein the opaque substrate is a cellulosic material.

3. The recording medium of claim 1, wherein the opaque substrate is a polymeric film.

4. The recording medium of claim 1, wherein the toner-receptive layer comprises an epoxy resin.

5. The recording medium of claim 3, wherein the epoxy resin, is derived from bisphenol A and epichlorohydrin.

6. The recording medium of claim 1, wherein the toner-receptive layer comprises a polyester resin.

7. The recording medium of claim 1, wherein the melting point of the resin is in the range of about 110° C. to about 170° C.

8. The recording medium of claim 1, wherein the wax is selected from the group consisting of hydrocarbon, hydrohalocarbon, ester-containing, synthetic, and natural waxes.

9. The recording medium of claim 8, wherein the wax is a hydrocarbon wax selected from the group consisting of polyethylene and polypropylene waxes.

10. The recording medium of claim 9, wherein the wax is a natural wax.

11. The recording medium of claim 1, wherein the wax has a melting point in the range of about 90° C. to about 150° C.

12. The recording medium of claim 1, wherein the toner-receptive layer further comprises an anti-static agent selected from the group consisting of cationically conductive polymers and anionically conductive polymers.

13. The recording medium of claim 1, wherein the toner-receptive layer further comprises pigment particles selected from the group consisting of silica, calcium carbonate, kaolin, aluminum hydroxide, starch, polystyrene, and poly (methyl methacrylate) particles.

14. The recording medium of claim 1, wherein the substrate has a thickness in the range of about 2 to about 8 mils.

15. The recording medium of claim 1, wherein the coat weight of the toner-receptive layer is the range of about 1 to about 15 grams per square meter.

16. The recording medium of claim 1, wherein the amount of wax in the layer is in the range of about 1% to about 5% by weight based on the weight of the layer.

17. The recording medium of claim 1, wherein the wax comprises wax particles having a mean diameter size in the range of about 1 to about 50 microns.

18. A process for producing an image on an electrophotographic recording medium comprising the steps of:

a) providing an electrophotographic recording medium comprising an opaque substrate having a surface coated with a toner-receptive layer comprising a resin selected from the group consisting of epoxy and polyester resins having a melting point in the range of about 105° C. to about 200° C., and wax having a melting point in the range of about 90° C. to about 200° C., wherein the amount of said wax in the layer is no greater than 14% by weight based on total weight of the layer, said recording medium having a surface gloss of at least 70 GU;

b) applying toner to form an image on the surface of the medium; and c) treating the medium with heat to fuse the toner to the medium.

19. The process of claim 18, wherein the medium is passed between heated rollers to fuse the toner to the medium.

20. The process of claim 19, wherein the heated rollers are non oil-coated.

* * * * *